United States Patent [19]

Bishop et al.

[11] Patent Number: 4,614,531
[45] Date of Patent: Sep. 30, 1986

[54] GLASS WARE REJECT SYSTEM

[75] Inventors: William B. Bishop, Deerfield, Ill.; David C. Oftelie, Center City; M. Victoria Selep, Roseville, both of Minn.

[73] Assignee: National Can Corporation, Chicago, Ill.

[21] Appl. No.: 682,326

[22] Filed: Dec. 17, 1984

[51] Int. Cl.⁴ .............................................. C03B 9/40
[52] U.S. Cl. ......................................... 65/158; 65/159; 65/160; 65/165; 65/DIG. 13
[58] Field of Search ......... 65/158, 159, 160, DIG. 13, 65/165

[56] References Cited

U.S. PATENT DOCUMENTS

| 3,767,374 | 10/1973 | Iacovazzi et al. | 65/160 X |
| 4,004,904 | 1/1977 | Fergusson | 65/158 |
| 4,332,606 | 6/1982 | Gardner | 65/160 X |
| 4,431,436 | 2/1984 | Lulejian | 65/160 X |

Primary Examiner—Arthur Kellogg
Attorney, Agent, or Firm—Robert A. Stenzel; Ralph R. Rath

[57] ABSTRACT

A computer based system for controlling the operation of a ware reject mechanism for an independent section glassware forming machine.

1 Claim, 4 Drawing Figures

GLASS WARE REJECT SYSTEM

DESCRIPTION

1. Technical Field

This invention relates to control systems for ware reject mechanisms for independent section glassware forming machines.

2. Background of the Invention

The present invention relates to a control system for a multiple section IS (independent section) glassware forming machine which identifies and rejects articles produced in a selected mold during a given cycle or cycles of operation.

IS glassware forming machines are well-known in the art and typically comprise a plurality of individual sections which are integrated into a single plural section machine fed by a single source of molten glass. The sections are operated in synchronism in such relative phase relationship as to permit the several sections to acquire gobs in ordered sequence from a single gob feeding means. Thus, as one of the sections is taking a gob from the feeding means, another section is delivering a finished ware to an output conveyor and the other intermediate sections are engaged in various forming steps intermediate the taking of a gob and the production of a finished ware.

It is customary to provide two molds in each section of an individual section machine whereby a gob is received in a first mold called the blank or parison mold for the initial process of forming a parison, followed by a transfer of the parison to a second mold called the blow mold for a final blowing of the article. By this means, each section of the machine is operating simultaneously upon multiple wares.

In order to control the operation of the various functional components of each section of a glass forming machine, means are provided for actuating each of the section elements in a preselected cyclic time format so that the operation of one element is synchronized with the operation of the other components in the section. In addition, means are provided for interrelating the timing of the individual sections with each other.

A function related to the operation of an IS machine and forming an integral part of such machine is the ware reject control system. Ware produced by the machine may be selectively rejected from the output on the conveyor. The rejection of individual ware may be desired in order to dispose of ware such as bottles known to have flaws therein, and more commonly the rejection of ware may be desired to delete a selected number of ware produced by the machine immediately subsequent to a swabbing of the molds. Ware reject systems are well known in the art, and no detailed description appears necessary at this point.

The preferred embodiment of the ware reject control system of the present invention is adapted to control the operation of a mechanism wherein applied electrical control signal cause operation of an associated reject mechanism. More specifically, electrical signals are employed to activate a reject mechanism to push selected ware off the conveyor, ejecting them from the production line.

It is a primary object of the present invention to provide a reject function which is a function of a software program. The reject system of the present invention may be adapted to selectively reject of one or more of the ware produced by any or all of the several sections of a machine.

Various reject control systems or devices for glassware machines are disclosed in the prior art such as for example, U.S. Pat. No. 3,767,374; U.S. Pat. No. 3,974,432; U.S. Pat. No. 4,004,904; and U.S. Pat. No. 4,332,606. Note that certain of these patents have software or programmed controlled functions. It will, of course, be understood that the foregoing enumerated patents are merely examplary of the art in the field.

SUMMARY OF THE INVENTION

The present invention is directed to means for selectively rejecting or cutting one or more specific wares or articles such as in a glassware machine that produces bottles in a cyclic operation from a plurality of molds. A mechanism controlled by a software program enables the selection of an article produced in a given mold during a particular machine cycle for rejection of the selected article as it is moved along an output conveyor as one of a series of articles.

A glassware IS machine normally includes a plurality of manually actuated mold switches that are associated respectively with each of the plurality of molds in the machine sections. If a machine section includes a blank mold and a blow mold, separate switches are provided for each. The switches are selectively actuated by the machine operator to initiate a ware reject initiating signal.

Section signal generating means are operatively coupled with the machine to generate a sequence of section signals corresponding to the order in which articles from the section are arranged on the conveyor. The section signal generating means are synchronized with the signal generating means to maintain a proper and sequential relation between the sections.

Signal delay means are connected with the plurality of mold switches actuated by the machine operator to delay the switch signals for different numbers of machine cycles after the respective switches are actuated. The number of cycles of delay for the respective signals is correlated with the movement of the articles from their corresponding molds in a section to a given station along the conveyor.

Further features and advantages of the present invention will become apparent from the following description, claims and drawings.

DESCRIPTION OF THE INVENTION

Figure 1:
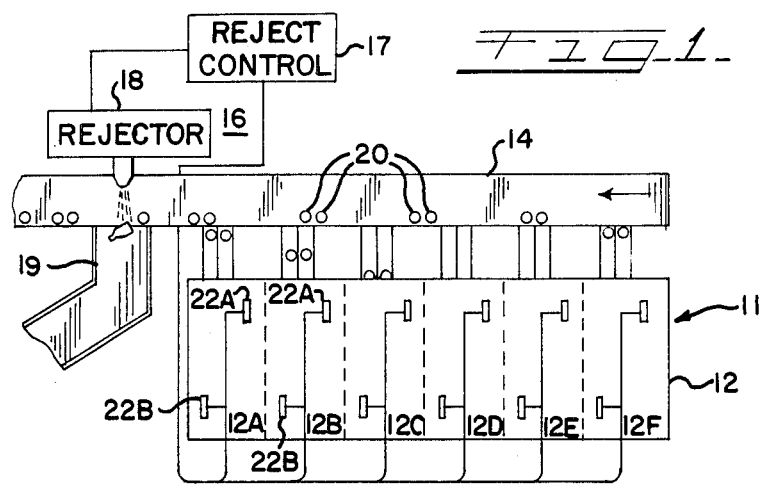
FIG. 1 shows an IS machine section including a reject control station.

FIG. 1 schematically depicts a known type of IS machine 11 having six sections, generally labeled 12 (and respectively labeled 12A, 12B, 12C, 12D, 12E and 12F), which continuously produce a plurality of articles during each cycle of operation of the machine. One such common type of IS machine is illustrated in U.S. Pat. No. 3,762,907 to Quinn, et al. and U.S. Pat. No. 3,877,915 to Mylchrest. In the embodiment depicted herein, machine 11 has a plurality of double gob forming sections 12, each of which produces two bottles in the course of a machine cycle and deposits the bottles serially on an output conveyor 14.

Figure 2:
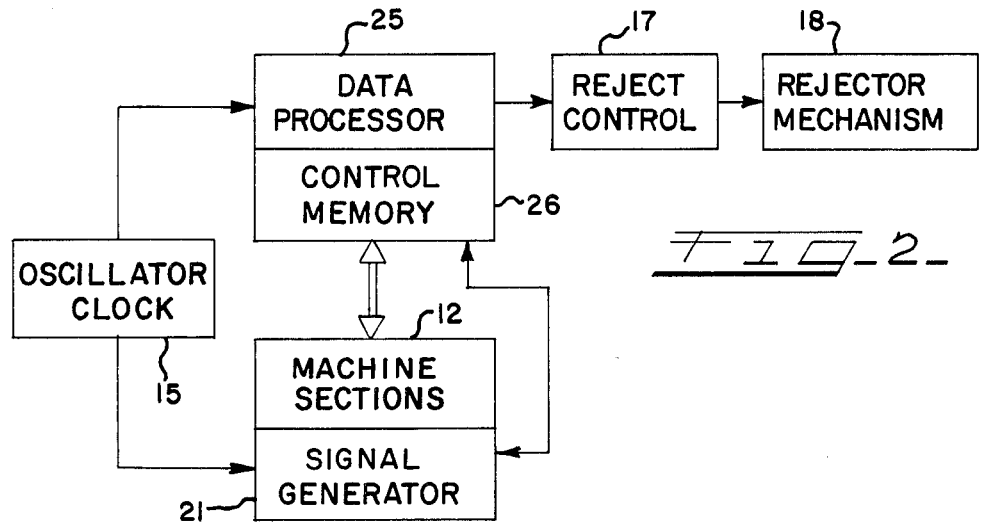
FIG. 2 shows a block diagram of a control system including means for controlling the reject mechanism.
Figure 3:
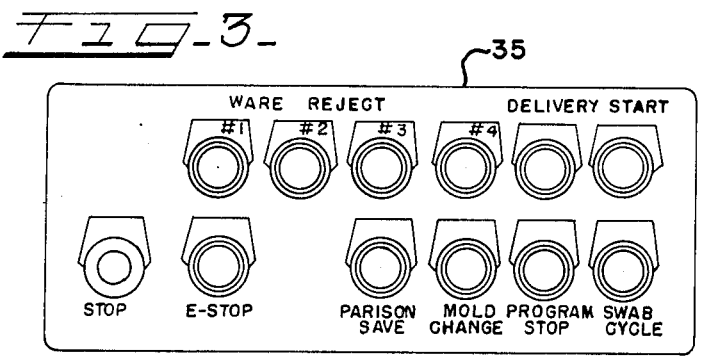
FIG. 3 shows a control panel for the control system for the IS machine.

Referring also to FIG. 2, the sections 12 are driven in synchronism with one another by means of a common timing mechanism such as an oscillator clock 15, via a signal generator 16 and the sections operate in phased relationship with each other so that a gob distributor (not shown) can feed molten glass sequentially to each of the sections in a predetermined operating or firing order.

The operation of the IS machine 11 is controlled by a suitable computer or data processor 25 including control memory 26 such as a DEC PDP-1147 made by Digital Equipment Corporation. An early type of a computer control for an IS machine is shown in U.S. Pat. No. 3,974,432 to Thompson.

The six sections 12 produce twelve bottles, generally labeled 20, during each cycle of machine operation. The two bottles from each section are deposited, as a pair, on the conveyor 14, and in series with bottles from other sections. The sections 12 are essentially identical in construction and thus the bottle spacing is the same between the sections. The rate of travel or speed of the conveyor 14 and the mechanisms which deposit the bottles from each section on the conveyor are adjusted or tuned and timed so that the bottles passing a given station down-stream of the sections are properly spaced. The order of the bottles on the conveyor are not necessarily positioned in the order in which the bottles were made, nor in the numerical order of the sections. The conveyor 14 carries the bottles in series past a reject station 16 including an electrically activated reject control 17 and a reject mechanism pneumatic (air jet) rejector 18 and thereafter toward a conventional lehr (not shown) for annealing the newly formed bottles.

In a machine operation described above, the molds of a section 12 are periodically swabbed with a releasing agent, and a black residue is deposited on the bottles formed in the subsequent cycle or cycles of operation. The control system of the present invention is used most often to actuate the reject control 17 to eject those bottles having a residue thereon which are pushed from the conveyor 14 into a suitable chute 19 for reprocessing in subsequent cycles of the machine. The reject control 17 functions to identify bottles formed by a particular mold during a particular cycle of operation and actuates the pneumatic (air) ejector 18 at the appropriate instant to reject the selected bottle.

The reject control 17 may be activated in response to the data processor 25 to continuously reject articles from a mold which may be damaged, and can reject all articles, such as is customarily done for a number of bottles when a mold is placed back into production. However, as mentioned above, the reject operation is generally applicable, but is most commonly used after a swabbing operation.

Referring to FIG. 1, switches generally labeled 22 are provided for sections 12 to allow the machine operator to identify the particular mold swabbed and to send a ware reject signal corresponding to that mold to the reject control 17 such as immediately after swabbing. One set of mold switches 22A is provided on the blank side of the machine where parisons are formed from the molten glass, and another set of switches 22B is provided on the blow side of the machine where the parisons are blown to the final configuration of the bottles.

Thus, the reject control 17 receives reject signals that discriminate between the blank mold side and the blow mold side in each machine section.

Additionally, each group of switches 22A or 22B includes the same number of switches as there are molds; that is, in a double gob machine, there are two blank and two blow molds in each section and two individual switches associated uniquely with each mold. Signals from these switches are handled in a discriminating manner by the reject control 17 so that only the bottle 20 produced by a particular mold during a particular cycle of operation is rejected. Thus, while in a preferred embodiment, the reject control 17 is designed to operate with a double gob machine having six individual sections such as shown in FIG. 1; it should be understood that the control 17 can be adjusted and utilized with single or multi-gob machines having fewer or more sections.

Refer now to the software control of the present invention, wherein a software program effects the solution to an algorithm to provide the ware reject function. The ware reject function is thus handled similarly as other timed functions of each machine section, note the panel 35 of FIG. 4.

Various manual entries are initially made to the system for each machine. For example, for number of machine sections, the number of gobs per section, the distance to the ware reject mechanism, the pushout in degrees, the air jet on-time in degrees, an assignment of gob number, the assignment of section numbers, the step in inches, and whether the machine is left handed or right handed are initially entered into the data processor 25, as is well-known.

For this explanation, assume that the IS machine 11, having six sections and two molds per section, is in operation and that the section 12A molds have been just been swabbed. To initiate the reject function, the operator activates the switches for the reject function in panel 15. As noted above, the reject function is treated or caused to function similarly as other programmed functions of the machine; that is, the reject function is programmed similarly as the mold-open, mold-closed, invert, etc. functions. Thus, the reject function is initiated and controlled by and from a cycle time reference.

Figure 4:
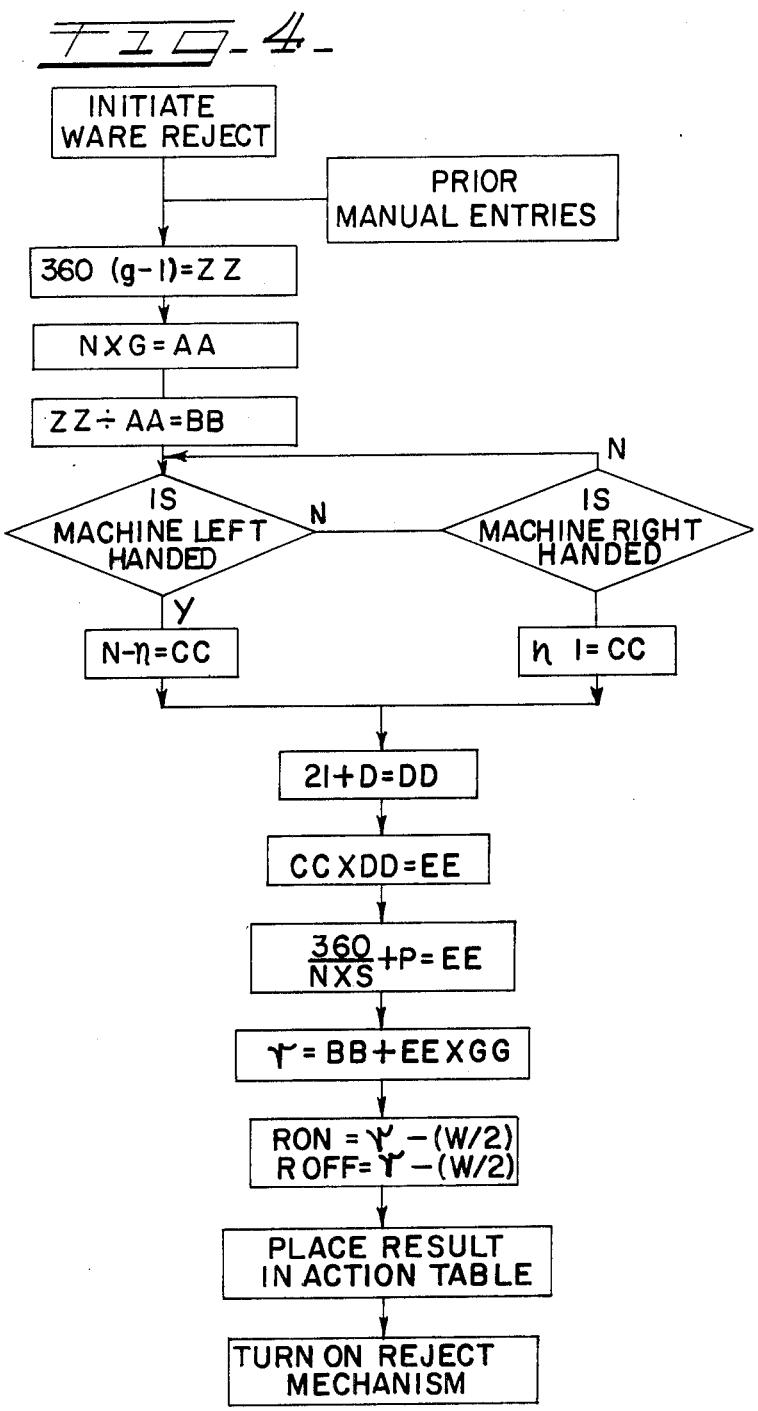
FIG. 4 shows a flow chart useful in explaining the operation of the invention.

The software program shown in FIG. 4 processes the following algorithm:

(a)

$$R(ON) = R - (W/2)$$

$$R(OFF) = R + (W/2); \text{ and,}$$

(b)

$$r = \frac{360 \times (g - 1)}{N \times G} + [(N - n) \times 21 + D] * \frac{360}{N \times S} + P$$

where
S = Step in inches,
N = Number of machine sections,
n = Number of the section to be rejected,
G = number of gobs per section,
g = Number of the gob to be rejected,
P = Pushout in degrees for the section, taking into account uneven deadplate time,
D = Distance to reject mechanism (air jet) from last section,
W = Airjet On time in degrees, and
R = Resulting reject center firing time in degrees r = Reject time measured to center of bottle
21 = Distance or spacing in inches between sections The differential degree of the machine relative to the zero of the oscillator clock is added to the foregoing algorithm; that is, for a difference between the zero of the machine and the zero indicator of the oscillator clock of 30 degrees, 30 degrees is added to the foregoing algorithm.

While the ware reject is handled in a manner similar to other timing functions, there is a difference in the timing for a ware reject function as compared to other machine functions. When a bottle is formed that is to be subsequently rejected (such as a bottle in a newly swabbed mold) the air jet is not actuated immediately. It takes some finite, calculable time for the bottle to reach a position where the air jet ejector 18 can actually perform its function.

The equation for "r" has three parts. The result is a number in degrees which corresponds to a time it takes for the bottle being formed when the ware reject function was actuated to reach the air jet. Any distances in inches or other linear measurement must be converted to degrees in order for the equation to be consistent. The first part of the equation, $$[360*(g-1)/(N*G)],$$

accounts for the individual gob in a section. Assuming the rest of the equation will produce the time delay to the air jet for the first gob out of a multiple-gob section, the first part of the equation will do the fine tuning to turn the air jet ON at the correct time for a particular gob in the section. The difference (in degrees) between any of the bottles on the conveyor belt must be $360/(N*G)$ since N sections will produce G bottles each in 360 degrees. One bottle is therefore $360/(N*G)$ degrees from the next bottle. Zero is added to the base number to reject the first bottle, and $(g-1)*360/(N*G)$ must be added to the base number to reject the "g"th bottle, where g is the gob number of the bottle to be rejected; "g" ranges from 1 to the number of gobs per section, G. (The symbol * is used as the multiplication symbol).

The second part of the equation, $$[(N-n)*21+D]*360/(N*S),$$

accounts for the amount of time the bottle must travel from the time it is placed on the conveyor belt until it reaches the air jet. $[(N-n)*21+D]$ is the distance in inches the bottle must travel. If the bottle is coming out of section "n", it must travel from section "n" to the end of the machine, and then travel from the end of the machine to the location at which the air jet is mounted. Each section is 21 inches wide, so the distance from section "n" to the end of the machine is $(N-n)*21$ inches for a right-hand machine.

Right-handed machines are defined as machines where the conveyor moves to the right when viewed from the conveyor side of the machine. If the conveyor moves to the left, it is a left-handed machine. FIG. 1 shows a right-handed machine.

The foregoing formula is applicable to both right and left handed machines. To adapt the formula to a left handed machine, or left moving conveyor, the term $(n-1)$ is substituted for the term $(N-n)$.

Once the bottle has traveled to the end of the machine, it must still travel the distance from the end of the machine to the air jet, a distance of "D" inches. When "D" is added to the distance the bottle has traveled to get to the end of the machine, the total distance traveled is obtained, and this distance must be converted into degrees.

Each section produces "G" bottles every machine cycle. The bottles produced by a section will be adjacent to each other on the conveyor belt if the machine is a multi-gob machine. However, the actual order in which the bottles are positioned on the moving conveyor is not necessarily in sequential order of the sections, nor the order in which the bottles were formed. However, since the bottles are evenly spaced, there is a constant distance between the first bottle of a section set on the belt and the first bottle of the next set in conveyor belt order. This distance is called the "step", or "S". It can be measured by measuring the distance between every "G"th bottle on the conveyor belt, where "G" is the number of gobs per section. The distance on the conveyor belt that one full cycle of bottles will occupy on the belt is simply (N*S), where N is the total number of sections in the machine. Therefore to convert from inches to degrees, the number of inches is multiplied by $[360/(N*S)]$.

The second part of the above equation is thus, $$[(N-n)*21+D]*360/(N*S),$$

and represents the distance, in degrees, that the bottles must travel from the time that they are deposited on the conveyor belt, until they reach the air jet.

The third part of the equation represents the timing, in degrees, at which each section's bottles are actually deposited on the conveyor belt (presumably the point at which the first bottle reaches the edge of the machine). This value will be different for each section, and is represented by the value "P" in the above equation. In order to maintain the even spacing on the conveyor, each section's "P" value is somewhat different, and the bottles from different sections will have uneven deadplate time as they wait for the proper time to be pushed onto the conveyor belt. Without the uneven deadplate time, it is difficult to assure that bottles from different sections will not be pushed into other bottles.

The ware reject mechanism is thus effectively actuated at a selected time after the bottle is delivered to the conveyor. In order to assure the eject (reject) mechanism (air jet) 18 is effectively centered on the container to be rejected, the amount of ON time of the ware reject control 17; that is, the amount of time of travel of the article on the conveyor during the period the ware reject control 17 is activated is divided by two and subtracted from the result to calculate the actual turn on time, R(ON). The OFF time of the ware reject control 17, R(OFF), is calculated by adding one-half of the ware reject control ON-time.

All functions of the ware control system 17 are referenced to or controlled by a timing signal generator 23. The time at which a particular operation is actuated within a section is determined by the software program for each individual section. The program effectively determines a particular time or cycle position that is reached when a specified operation is to take place. The time period is set in accordance with the firing order of each different section 12 so that each section operates in phased relationship with the others.

Accordingly, each given machine section 12 produces signals that are already synchronized with the operation of the section; and, the only further processing of a section signal needed to generate a reject signal properly timed to remove an article from an output conveyor at a remote rejection station is the delay time between the machine section and the station as given by the foregoing algorithm.

While the invention has been particularly shown and described with reference to a preferred embodiment thereof, it will be understood by those skilled in the art, that various changes in form and details be made therein without departing from the spirit and scope of the invention.

We claim:

1. A ware reject control system for an IS glassware forming machine having multiple operable sections each making respective wares, conveyor means for receiving and transporting said wares as a series of individual wares, a clock signal providing means, said sections operating cyclically responsive to said clocking signals, data processing means operable to control said machine and sections, a ware reject mechanism providing an air jet positioned adjacent said conveyor spaced from said machine and operable to eject said wares from said conveyor, a plurality of manually operable control switch means connected to couple reject signals for controlling said reject mechanism in response to desired operating parameters for said sections including parison save, mold change, program stop and swab cycle functions and said control button means discriminating between the blank mold side and the blow mold side of each of said sections, means providing a selected delay time for correlating the ware made by each section and its conveyor transporting time to said mechanism to control the ejection of selected wares, means for centering the glassware opposite said air jet including means for timing a given ON time of the air jet, means for timing the travel time of the container during the ON time of the air jet, and means for dividing the given ON time by two to determine an actual turn on point of the air jet to assure the air jet is centered on the glassware when the air jet is turned ON, and whereby each reject function is handled similarly as other timed functions of said machine sections.

* * * * *